Sept. 6, 1932. R. W. CHANABERRY 1,876,487
BONDING LOCKNUT
Filed Sept. 11, 1930
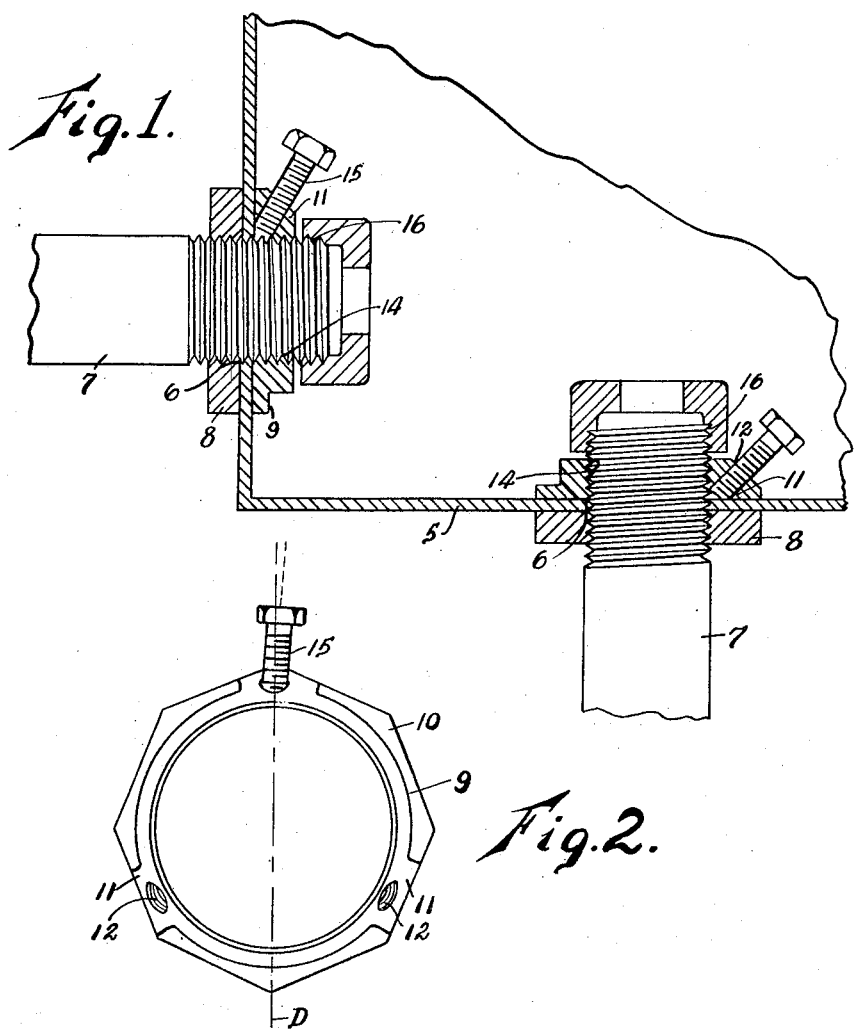
Inventor
Ray W. Chanaberry Patented Sept. 6, 1932

1,876,487

UNITED STATES PATENT OFFICE

RAY W. CHANABERRY, OF LOUISVILLE, KENTUCKY, ASSIGNOR TO THE WADSWORTH ELECTRIC MANUFACTURING COMPANY, OF COVINGTON, KENTUCKY, A CORPORATION OF KENTUCKY

BONDING LOCKNUT

Application filed September 11, 1930. Serial No. 481,136.

The present invention relates to a simple and inexpensive bonding locknut for establishing a good electrical bond as well as a good mechanical connection between a metal conduit and a metal plate or box.

An object of this invention is to provide a locknut with means whereby perfect electrical connection is attained with a maximum of surety and a minimum of expense in time, labor and material.

These and other objects are attained by the means described herein and disclosed in the accompanying drawing, in which:

Fig. 1 shows a fragment of a typical connection between a switch box or cabinet and wiring conduits with devices of the invention.

Fig. 2 is a top plan view of a bonding locknut of the invention.

Safe practice requires a good electrical bond between metal conduits and metal cabinets or plates in order to afford safety to the person in the event of breakage of wires or loose connection.

In the drawing, 5 represents the sidewalls of a metal cabinet having perforations or apertures 6 into which extend the metal conduits 7 which are usually made of metal pipe and through which wires enter and wires leave the cabinet. The conduit 7 is threaded for a distance at the entering end and has an ordinary nut 8 thereon against which the outer face of the cabinet wall abuts. The locknut of the invention indicated generally as 9 is disposed on one face of the plate or cabinet and preferably interiorly of the cabinet and receiving the conduit. The locknut has the usual polygonal flange 10 to receive a wrench or the like for driving it home against the inner face of the cabinet wall which is then tightly clamped between the outer nut 8 and inner locknut 9.

At intervals about the nut 9 are provided integral bosses or fillets 11 having tapped holes 12 extending therethrough at an agle, conveniently about 45 degrees to the abutting face of the nut and to the outside of the conduit. These tapped holes cut through the female threads 14 in the nut 9 and an adjacent portion of the face of the nut. With the nut 9 in position as shown in Fig. 1, a set screw 15 is driven entirely through the tapped hole 12 so that the end of the screw wedges firmly into contact with inner face of cabinet wall 5 and the threads 16 on the outside of the conduit 7. The set screw is preferably cup-pointed. This wedging action at once forms a perfect electrical bond between the cabinet and conduit and a mechanical lock for nut 9. The tapped holes 12 are also inclined slightly to a plane in which diameter D and the major axis of the nut lie so that the action of the set screw also exerts a force which turns or pulls the locknut tighter on the conduit. Alternatively stated, the axis of the tapped hole stands in a direction which is neither parallel to nor intersecting the major axis of the nut. The usual bushing 16 may be provided on the end of the conduit interiorly of the cabinet.

It will be understood that the bonding locknut 9 of the invention may be modified as to design without departing from the spirit and scope of the present invention.

The nuts 9 may be used on either or both faces of the cabinet wall although one such device will obviously suffice to effect a perfect metal to metal bond between the parts connected thereby. This construction eliminates the necessity for expensive additional wiring and connector pieces in order to effect a proper bonding of the parts.

What is claimed is:

1. A lookout for mechanically and electrically bonding a threaded metal conduit member and a metal plate comprising a nut having an abutting face, a conduit receiving threaded bore, and a tapped hole disposed at such angle to said face and the wall of the threaded bore as to cut through adjoining portions of each.

2. In a device of the class described the combination of a nut having a conduit receiving threaded bore and an abutment face at right angles to the axis of the bore, the nut also having a tapped hole passing at an angle of approximatley forty-five degrees to the abutment face and also at an angle to a plane in which lie both the major axis and a diameter of the nut which passes through the tapped hole and cutting through the adjoining portions of the abutment face and the wall of the threaded bore, and a set screw in the tapped hole.

3. In combination with a metal plate member having a perforation therein and a threaded metal conduit in said perforation, of means for effecting a mechanical and electrical bond between said conduit and plate member comprising a nut on the threaded conduit abutting one face of the plate, a second nut on the threaded conduit abutting the opposed face of said plate and a set screw threadedly extending through the body of one of said nuts and having the end thereof engaging the plate member adjacent the perforation and the threads on the conduit.

4. In a device of the class described the combination with a perforate metal plate having a threaded metal pipe conduit disposed in the perforation therein, of an abutment means on the conduit against one face of the plate, a nut on the conduit abutting the opposite face of the plate and a set screw extending through the sidewall of the nut at an angle of about forty-five degrees and having the end thereof in wedging contact with the face of the plate and the threaded portion of said conduit.

5. As a new article of manufacture a bonding locknut comprising an annular body having interior threads for the reception of a threaded metal conduit, and a set screw extending angularly through the body of the locknut in such direction that the end of said screw may uniformly and simultaneously engage the threads of a conduit in the nut and the face of a metal plate or the like in which the conduit is inserted with the nut in abutment therewith.

6. As a new article of manufacture a bonding locknut comprising a nut having a plurality of spaced tapped holes extending angularly from the outside thereof inwardly and cutting through a portion of one end face of the nut and the immediately adjacent normal threads of the nut, and a set screw selectively disposed in one of said tapped holes.

7. In combination a perforate metal plate, a threaded metal conduit extending through the perforation in the plate, an abutment on the conduit on one face of the plate, a bonding locknut screwed onto the conduit for clamping the plate against the abutment, and a set screw extending angularly through the body of said locknut in such direction as to simultaneously contact and exert a wedging action on the plate and conduit and tending to further turn and tighten the locknut on the conduit.

8. As a new article of manufacture a bonding locknut comprising an annulus having internal screw threads, and a tapped hole through the annular portion, the axis of the tapped hole being in a direction neither parallel to, nor intersecting the major axis of the annulus, and a set screw positioned in the tapped hole.

In testimony whereof, I have hereunto subscribed my name this 29 day of August, 1930.

RAY W. CHANABERRY.

CERTIFICATE OF CORRECTION.

Patent No. 1,876,487.  September 6, 1932.

RAY W. CHANABERRY.

It is hereby certified that error appears in the printed specification of the above numbered patent requiring correction as follows: Page 1, line 84, claim 1, for the word "lockout" read locknut; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)